United States Patent
Kegel (10) Patent No.: US 9,798,479 B2
(45) Date of Patent: Oct. 24, 2017

(54) RELOCATABLE AND RESIZABLE TABLES IN A COMPUTING DEVICE

(71) Applicant: Advanced Micro Devices, Inc., Sunnyvale, CA (US)

(72) Inventor: Andrew G. Kegel, Redmond, WA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 62 days.

(21) Appl. No.: 14/931,126

(22) Filed: Nov. 3, 2015

(65) Prior Publication Data

US 2017/0123693 A1    May 4, 2017

(51) Int. Cl.
*G06F 3/06* (2006.01)
*G06F 12/02* (2006.01)

(52) U.S. Cl.
CPC .......... *G06F 3/0619* (2013.01); *G06F 3/065* (2013.01); *G06F 3/0683* (2013.01); *G06F 12/023* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 5,802,590 A * | 9/1998 | Draves | ............... | G06F 9/468 711/163 |
| 2002/0178340 A1* | 11/2002 | Collins | ............... | G06F 12/145 711/206 |
| 2008/0228691 A1* | 9/2008 | Shavit | ............... | G06F 17/30949 |
| 2011/0078163 A1* | 3/2011 | Veres | ............... | H04L 41/0677 707/754 |
| 2011/0283082 A1* | 11/2011 | McKenney | ............... | G06F 12/1018 711/202 |
| 2016/0019036 A1* | 1/2016 | Bar-Or | ............... | G06F 8/66 717/159 |
| 2016/0019054 A1* | 1/2016 | Bar-Or | ............... | G06F 8/66 717/168 |

* cited by examiner

*Primary Examiner* — Kevin Verbrugge
(74) *Attorney, Agent, or Firm* — Park, Vaughan, Fleming & Dowler LLP (57) ABSTRACT

The described embodiments include a computing device that performs operations for at least one of resizing or relocating a table in a memory in the computing device. In the described embodiments, the computing device includes at least one register storing a table base address indicating an original location of an original table in the memory and a table size indicating an original size of the original table in the memory. When relocating the original table, the computing device copies, using the table base address, some or all of the entries from the original table to a new table in the memory and then updates the table base address to indicate a location of the new table in the memory. When resizing the original table, the computing device updates the table size to indicate a new size.

18 Claims, 9 Drawing Sheets

BEFORE RELOCATION:

AFTER RELOCATION:

FIG. 9

BEFORE RELOCATION AND RESIZING:

AFTER RELOCATION AND RESIZING:

FIG. 10

BEFORE RESIZING:

AFTER RESIZING:

FIG. 11

```
Move_and_resize_device_table( IOMMU *IOMMUp, dev_tab *new_tablep, unsigned
new_size)
{
      dev_tab *old_tablep;
      unsigned old_size;

old_tablep = IOMMUp->Device_Table_Base_Address_Register &
DevTabBase_MASK;
      old_size = IOMMUp->Device_Table_Base_Address_Register &
DevTabSize_MASK;

new_tablep &= DevTabBase_MASK;

if (new_size > old_size)
      {
            zero_fill(new_tablep+(old_size*4096), (new_size-old_size) * 4096);
            memcpy(new_tablep, old_tablep, old_size * 4096);
      }
      else
      {
            memcpy(new_tablep, old_tablep, new_size * 4096);
      }

IOMMUp->Device_Table_Base_Address_Register = new_tablep || new_size;

return SUCCESS;
}
```

FIG. 12

RELOCATABLE AND RESIZABLE TABLES IN A COMPUTING DEVICE

BACKGROUND

Field

The described embodiments relate to computing devices. More specifically, the described embodiments relate to relocatable and resizable tables in computing devices.

Related Art

Some computing devices use tables to keep records of devices, the tables including information useful for interacting with the devices. For example, in some computing devices, an input-output management unit (IOMMU) maintains an active device table that is used to handle interactions with peripheral devices (e.g., input-output (IO) devices). In such computing devices, the IOMMU may use information from or based on the active device table to handle transactions for peripheral devices, interrupts from/associated with peripheral devices, address translations for addresses in requests from peripheral devices, and/or other operations. In some of these computing devices, the active device table is stored in a main memory of the computing device. For example, the active device table may include 65,536 256-bit entries, each entry configured to store device information for a peripheral device, and thus may be stored in a 2 Mb block/region (contiguous or segmented) in the main memory.

In some computing devices, tables stored in the main memory may be resized and/or relocated during operation of the computing device. For example, in some computing devices, an operating system or hypervisor may initially allocate, for a table, a block of memory of an original size at an original location in memory (e.g., a table with 24 64-byte entries would be allocated 1,536 bytes starting from a given address A in memory). During operation, e.g., as demand for the table and/or memory space increases or decreases, the table may be relocated to a new location in memory, perhaps while also being resized (i.e., made larger or smaller), and/or may be resized at the original location in memory.

Although resizing and/or relocating tables might be beneficial, for certain tables, resizing and/or relocating the tables is not permitted. For example, the above-described active device table is typically allocated at startup (or "statically" allocated), and is not permitted change size and/or location during the operation of the computing devices. Because the computing device may have a varying number of peripheral devices (e.g., devices that are plugged and unplugged from the computing device, become available/unavailable, etc.), may not have 65,536 peripheral devices, and/or different computing devices may be configured to use the active device table in different ways, having the active device table statically allocated can lead to sub-optimal operation for the computing device. For example, the active device table may consume more memory than necessary, may not have enough space to store device information for certain peripheral devices, and/or be located in a sub-optimal location in the memory.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Overview

The described embodiments use tables stored in a memory in a computing device for performing operations in the computing device. For example, in the described embodiments, an active device table stored in the memory is used when interacting with peripheral devices (e.g., input-output (IO) devices). In some embodiments, the active device table include address translation information, interrupt handling information, control bits, etc. that are used interacting with corresponding peripheral devices. In the described embodiments, the computing device is able to relocate and/or resize tables in the memory.

In some embodiments, the computing device maintains a set of values associated with a given table that are used by entities in the computing device for performing operations involving the given table. For example, the values associated with an active device table can be used by an input-output memory management unit (IOMMU) for performing reads of the active device table, updates of the active device table, monitoring of the active device table, etc. In some embodiments, the set of values includes a table base address and a table size for the corresponding table. The table base address and table size include, respectively, a value indicating the location of the corresponding table in the memory (e.g., a memory address where the table starts) and a size value that indicates a size of the table.

In some embodiments, a software entity (e.g., an operating system, a hypervisor, an application program, a daemon, etc.) or a hardware entity (e.g., an IOMMU, a monitoring circuit, etc.) in the computing device can relocate a table from an original location in the memory to a new location in the memory by performing a memory copy operation to copy the contents of the table from the original location to the new location and then updating the table base address to a starting address (or another address) of the new location in the memory.

In some embodiments, a software entity or a hardware entity can resize a table by updating the table size. In these embodiments, the resizing can occur as the table is relocated, so that the table is both relocated and resized, by updating both the value of the table size and the table base address. In some embodiments, the table base address and table size are stored in a single register, which can be updated to update both the table base address and table size. In addition, in these embodiments, a table can be resized in place, i.e., without also being relocated, by updating the table size without updating the table base address. In these embodiments, when table size is reduced, existing entries may be dropped or reorganized.

By performing the operations herein described, the computing device is able to relocate and/or resize tables without significantly effecting the interaction with the table by the computing device. For example, by relocating and/or resizing the active device table as described herein, some embodiments can relocate and resize the active device table without halting or significantly effecting the operation of and interaction with peripheral devices. This in turn enables the computing device to locate and size tables based on the needs of the computing device, e.g., to save memory, place tables in a desired location in the memory, etc., without a significant penalty in the operation of the computing device, thereby improving the overall performance of the computing device.

Computing Device

Figure 1:
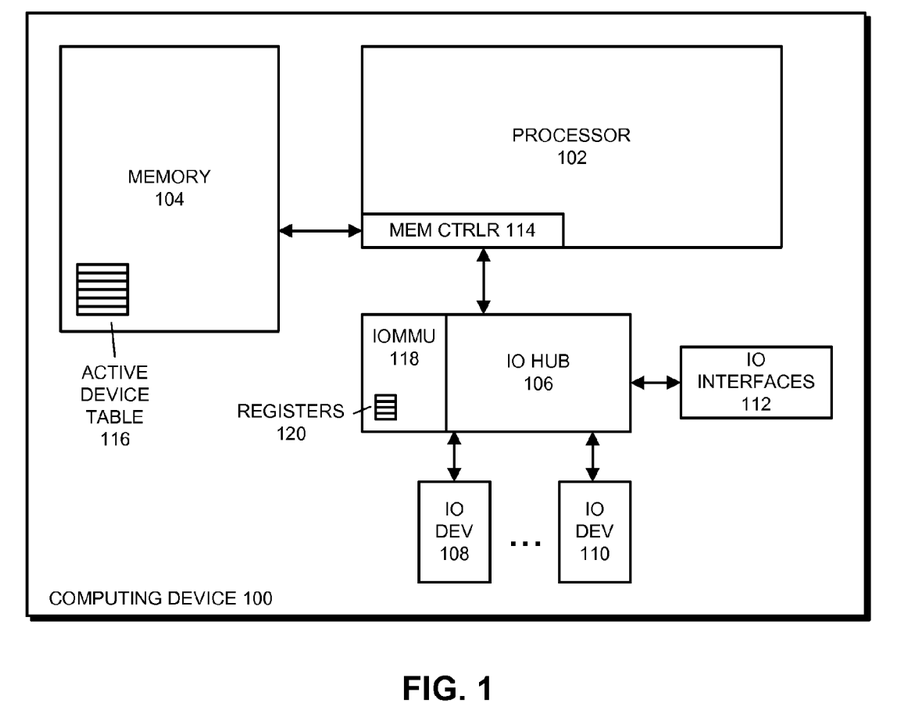
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processor 102, memory 104, input-output (IO) hub 106, IO devices 108-110, and IO interfaces 112. Processor 102 is a functional block that performs computational operations. In some embodiments, processor 102 includes one or more central processing units (CPUs), processor cores, graphics processing units (GPUs), embedded processors, application specific integrated circuits (ASICs), and/or other computational mechanisms that perform some or all of the computational operations.

Memory 104 is a functional block that performs operations for storing and providing data and instructions to the functional blocks in computing device 100. Memory 104 comprises memory circuits such as one or more of DRAM, DDR SDRAM, and/or other types of volatile and/or non-volatile memory circuits that are used for storing instructions and data for the other functional blocks, as well as control circuits for handling accesses of the instructions and data that are stored in the memory circuits. In some embodiments, memory 104 is the "main memory" in computing device 100.

As can be seen in FIG. 1, processor 102 includes memory controller 114 ("MEM CTRLR 114"). Memory controller 114 performs operations for handling interactions between processor 102 and memory 104, such as handling reading and writing of data from processor 102 to memory 104, controlling the memory circuits in memory 104, virtual address to physical address translations, etc.

IO hub 106 is a functional block that handles interactions between peripheral devices such as IO devices 108-110 and interfaces such as IO interfaces 112 (and peripheral devices connected thereto) and processor 102, memory 104, and other functional blocks in computing device 100. For example, IO hub 106 may receive communications (inputs, events, interrupts, data, etc.) from peripheral devices, perhaps via IO interfaces 112, and forward the communications to processor 102, memory 104, and/or other functional blocks in computing device 100. As another example, IO hub 106 may receive communications (commands, outputs, events, interrupts, data, etc.) from processor 102, memory 104, and/or other functional blocks in computing device 100 and forward the communications to corresponding peripheral devices, perhaps via IO interfaces 112.

IO devices 108-110 include actual/real or virtual peripheral devices, which are generally devices that interact with functional blocks in computing device 100. For example, in some embodiments, IO devices 108-110 include one or more of disk drives, bus-connected devices (e.g., PCIe connected devices), extension cards (video cards, sound cards, etc.), mice/keyboards, microphones, etc.

IO interfaces 112 include interfaces such as a low pin count (LPC) interface, a universal serial bus (USB) interface, a peripheral component interface (PCI) interface, a serial ATA (SATA) interface, etc. to which peripheral devices may be connected.

Memory 104 stores active device table 116 (i.e., active device table 116 is stored in a portion of the memory circuits in memory 104). In some embodiments, active device table 116 stores information about peripheral devices in computing device 100 such as IO device 108, IO device 110, etc. Active device table 116 is described in more detail below.

As can be seen in FIG. 1, IO hub 106 includes IOMMU 118. IOMMU 118 is a functional block that performs operations to enable interaction with peripheral devices. For example, IOMMU 118 may perform operations such as address translation for memory accesses for peripheral devices, memory access protection for accesses in memory 104 from peripheral devices, peripheral event and interrupt handling, etc. IOMMU 118 includes a set of registers 120 that store values associated with active device table 116. Generally, the values in the registers 120 are used by IOMMU 118 and/or other functional blocks in computing device 100 for performing operations such as writing data to active device table 116, reading data from active device table 116, finding and relocating active device table 116 in memory 104, determining a size of and resizing active device table 116, monitoring active device table 116, etc. In some embodiments, registers 120 include one or more register(s) for device table base address 300 (see FIG. 3), a device table size 302, a device table base address mask 304, and a device table size mask 306.

In some embodiments, communication paths (that include one or more buses, wires, and/or connections) are coupled between the various elements in computing device 100 (processor 102, memory 104, etc.), as shown by arrow-headed lines between the elements. The communication paths are used to transmit commands, data, event notifications, interrupts, and/or other information between the elements.

Although computing device 100 is described with a particular arrangement of functional blocks, some embodiments include a different number and/or arrangement of functional blocks. For example, some embodiments have multiple processors. As another example, in some embodiments, computing device 100 includes a number of cache memories. As yet another example, in some embodiments, registers 120 are located elsewhere in computing device 100, but otherwise usable as described herein. As yet another example, in some embodiments, computing device 100 includes a different number of peripheral devices and/or IO interfaces (shown. e.g., using an ellipsis between IO device 108 and IO device 110 in FIG. 1). Generally, the described embodiments can use any number or arrangement of functional blocks that can perform the operations herein described.

In addition, although computing device 100 is simplified for illustrative purposes, in some embodiments, computing device 100 includes additional functional blocks or other elements for performing the operations herein described and/or other operations. For example, computing device 100 may include power controllers, batteries, media processors, communication mechanisms (e.g., a northbridge, a southbridge, etc.), networking mechanisms, display mechanisms, etc.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, network appliances, toys, audio-visual equipment, home appliances, controllers, etc., and/or combinations thereof.

Active Device Table

As described above, active device table 116 is used to store information about peripheral devices such as IO device 108, IO device 110, etc. that perform operations (e.g., originate IO transactions, communicate, cause or respond to interrupts, etc.) in computing device 100. Generally, the information in active device table 116 is used for interacting with corresponding peripheral devices. For example, active device table 116 may store, for peripheral devices, peripheral device identifier(s), address translation information, interrupt remapping information, and interrupt virtualization information, control bits, metadata, and/or other device information useful for interacting with the peripheral devices.

Figure 2:
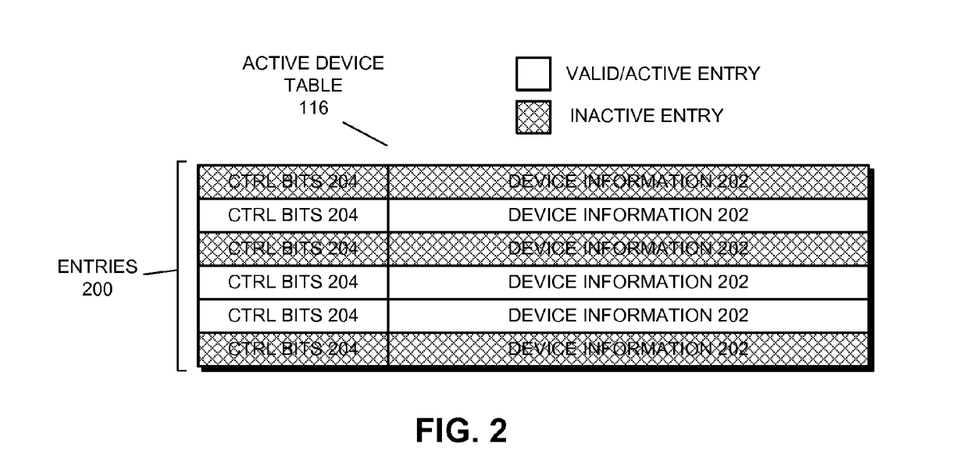
FIG. 2 presents a block diagram illustrating an active device table in accordance with some embodiments.

FIG. 2 presents a block diagram illustrating active device table 116 in accordance with some embodiments. As can be seen in FIG. 2, active device table 116 includes a number of entries 200, each of which includes device information 202 and control bits 204 associated with a corresponding peripheral device. Device information 202 generally includes one or more values associated with, and for interacting with, the corresponding peripheral device. For example, as described above, device information 202 may include device identifier(s), interrupt processing information (interrupt table pointers, interrupt table length, etc.), address translation information (page table pointers, page table length, etc.), and/or other information. Control bits 204 include various bit(s) (i.e., portions comprising one or more bits) indicating information about the peripheral device or computing device 100, features supported by the peripheral device or computing device 100, formats of communication with the peripheral device or computing device 100, event/interrupt handling information for the peripheral device or computing device 100, and/or other information. In some embodiments, each entry 200 includes metadata or other information (validity information, expiration information, etc.) (not shown) for determining a state of the entry 200. In some embodiments, entries 200 in active device table 116 are formatted as described in the *AMD I/O Virtualization Technology (IOMMU) Specification*, rev 2.62, February 2015, from AMD Inc. of Sunnyvale, Calif.

As shown in FIG. 2, some entries in active device table 116 are "inactive," while other entries are "valid" or "active." In some embodiments, the amount of device information 202 (and control bits 204, herein referred to generically as "device information") stored in active device table 116 varies over time as peripheral devices become available (e.g., are plugged in, become active/awaken from a low-power state, start/restart, etc.) or unavailable (e.g., crash, halt, are unplugged, become inactive/enter a low-power state, etc.) to computing device 100. Valid or active entries 200 in active device table 116 hold device information 202 for peripheral devices that should be available to computing device 100. Inactive entries 200 in active device table 116 do not presently hold device information 202 or hold invalid, outdated, etc. device information. In some embodiments, valid/active entries 200 can be distinguished from inactive entries 200 by a valid flag in metadata in each entry 200. In these embodiments, when the valid flag is "set" to a predetermined value (1, A, 0, etc.), the entry 200 is valid/active, and when the valid flag is not set to the predetermined value, the entry 200 is inactive.

During operation, when a peripheral device becomes available or when computing device 100 starts up, boots, resets, restarts, etc., the peripheral device communicates with computing device 100 to cause computing device 100 to add, to an entry 200 in active device table 116, information about the peripheral device. For example, a peripheral device such as IO device 108, or a driver for IO device 108, can communicate with a basic input output system (BIOS) executing on computing device 100, with an operating system or other software routine executing on computing device 100 to cause the BIOS, operating system, and/or software routine to add information about IO device 108 to active device table 116. As another example, a peripheral device such as IO device 108, or a driver for IO device 108, can communicate with IOMMU 118 to cause IOMMU 118 to add information about IO device 108 to active device table 116.

In some embodiments, when a device becomes unavailable (e.g., powers down), the device may remove itself from active device table 116 using a process similar to the addition process described above. In some embodiments, entries 200 in active device table 116 are associated with time-to-live values, lease values, etc. (e.g., in metadata for each entry, etc.) and thus will eventually expire and be removed from the active device table 116 if a device is no longer available, is unresponsive, etc.

Although device information 202 and control bits 204 are described as including certain information, in alternative embodiments, device information 202 and control bits 204 include at least some different information. Generally, active device table 116 and/or device information 202 and control bits 204 include sufficient information to enable IOMMU 118 to interact with peripheral devices.

Registers Associated with the Active Device Table

As described above, in some embodiments, computing device 100 maintains a set of values associated with active device table 116 that are used by entities in the computing device (e.g., IOMMU 118, processor 102, software entities, etc.) for performing operations using active device table 116 (e.g., reads, writes, monitoring, etc.). In some embodiments, the values are stored in registers 120.

Figure 3:
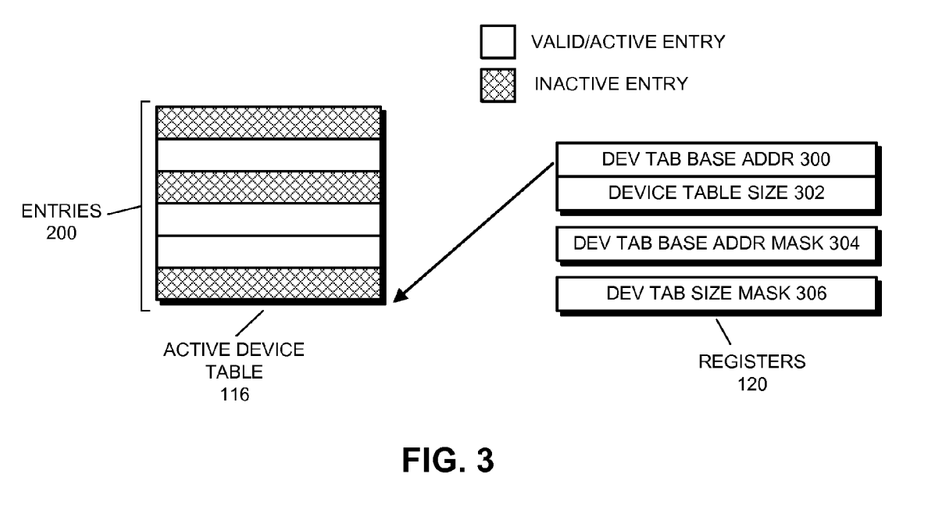
FIG. 3 presents a block diagram illustrating registers in accordance with some embodiments.

FIG. 3 presents a block diagram illustrating registers 120 in accordance with some embodiments. As can be seen in FIG. 3, registers 120 include registers for storing device table base address 300, device table size 302, device table base address mask 304, and device table size mask 306. Device table base address 300 is a value that indicates a location where active device table 116 is stored in memory 104 (or a first segment of active device table 116 is stored in memory 104, when active device table 116 is segmented). Generally, it is not required that active device table 116 always be stored in a single, set location in memory 104 (i.e., does not necessarily always appear at the same location in memory 104) and/or be a single contiguous block of memory. Device table base address 300 is therefore used by computing device 100 (i.e., processor 102, IOMMU 118, a software entity, etc.) for determining where active device table 116 is currently located in memory 104 (or where a first segment of active device table 116 is located in memory 104, when active device table 116 is segmented). The value stored in device table base address 300 can be any value that directly or indirectly represents a location in memory 104. For example, device table base address 300 can store one or more of an absolute or relative address of a first, last, or middle entry of active device table 116, an offset from a known address value of a given entry in active device table 116, a predetermined location indicator, etc. As can be seen in the embodiment shown in FIG. 3, device table base address 300 includes a pointer (shown as an arrow) that indicates a starting address of active device table 116. The pointer may be an actual address such as an N-bit address (where N depends on the addressing scheme used in computing device 100) or another value.

Device table size 302 is a value that indicates a size of active device table 116 in memory 104. Generally, it is not required that active device table 116 always be a single, fixed size (e.g., number of bytes, number of entries, etc.). Device table size 302 is therefore used by computing device 100 to determine the present size of active device table 116. The value stored in device table size 302 can be any value that directly or indirectly represents a size of active device table 116. For example, the value can be a number that represents a number of fixed-size entries in active device table 116, a number of bytes in memory 104 used for storing active device table 116 (which can be used to determine a number of fixed-size entries that are present in active device table 116), etc. When used in conjunction with device table base address 300, device table size 302 can be used to determine a location of and number of fixed-size entries in active device table 116, and thus to characterize active device table 116.

Device table base address mask 304 and device table size mask 306 are bitmasks that are used for performing operations on or with device table base address 300 and device table size 302. For example, in some embodiments, a single 64-bit register holds device table base address 300 and device table size 302 in bit positions 51-12 and 8-0, respectively (the remaining bits can be used for other purposes or unused) (see, e.g., device table base address register 400 in FIG. 4). In these embodiments, device table base address mask 304 can be used for operations based on the device table base address 300, and can therefore hold a first predetermined value in bit positions 51-12 and a second predetermined value for bit positions 52-63 and 0-11. For example, in some embodiments, device table base address mask 304 has 1's in bit positions 51-12 and 0's in all other bit positions. In these embodiments, device table base address mask 304 can be used for/with logical operations such as bitwise AND, XOR, and/or other operations when performing operations (e.g., setting or clearing bits, reading only device table base address 300 from the single register, etc.) for device table base address 300. In these embodiments, device table size mask 306 functions similarly to device table base address mask 304, but with bits 0-8 set to the first predetermined value, and bits 9-63 set to the second predetermined value.

Figure 4:
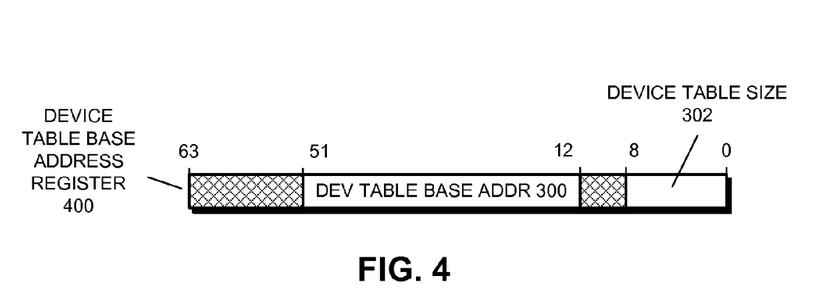
FIG. 4 presents a block diagram illustrating a device table base address register in accordance with some embodiments.

As described above, although an embodiment is shown in FIG. 3 in which device table base address 300 and active device table size 302 are stored separately, in some embodiments a single register may be used to both store device table base address 300 and active device table size 302. For example, FIG. 4 presents a block diagram illustrating a device table base address register 400 that is used to store both device table base address 300 and active device table size 302 in accordance with some embodiments. As can be seen in FIG. 3, device table base address register 400 is a 64-bit register with 9 bits used for storing active device table size 302 and 40 bits used for storing device table base address 300 (the shaded bits are reserved and/or used for other purposes). Note that 40 bits may be used for device table base address 300 because, in some embodiments, active device table 116 is byte-aligned, meaning 40 bits are combined with some predetermined set of address bits (e.g., zeros for a lower set of address bits) to arrive at an address for active device table 116—in some embodiments, a different number of bits is used for device table base address 300. In some embodiments, holding both device table base address 300 and active device table size 302 helps with an atomic update of both values (as only one register is being written).

Although certain registers and values are shown in FIG. 3, in some embodiments, other numbers or types of registers and/or values are used. Generally, the described embodiments include sufficient values and/or registers to perform the operations herein described.

Software Entities

Figure 5:
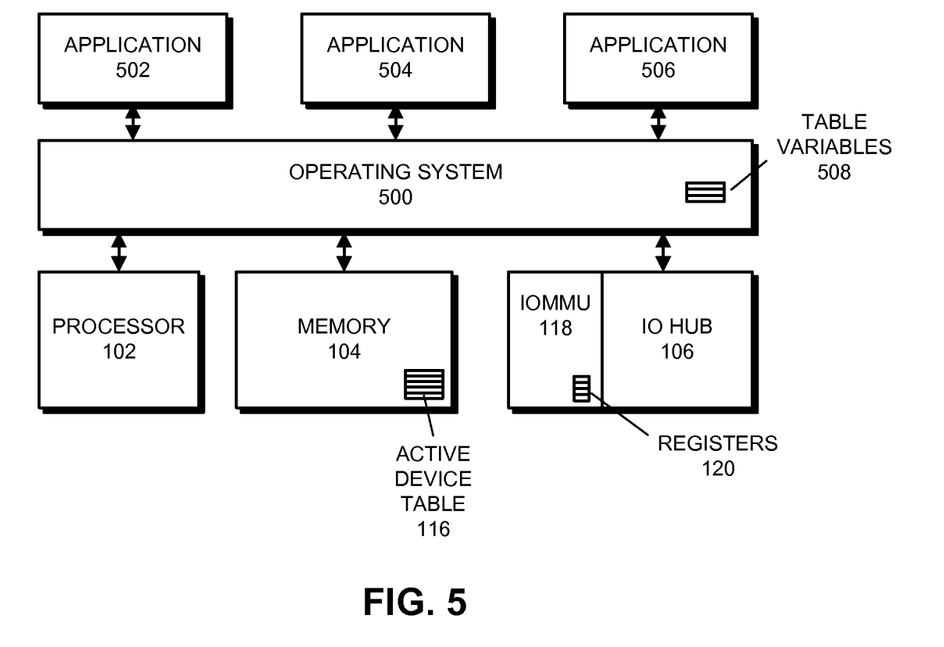
FIG. 5 presents a block diagram illustrating software entities and hardware entities in accordance with some embodiments.

In some embodiments, one or more software entities executed by processor 102 (or another functional block) in computing device 100 may cause processor 102 to perform operations for relocating and/or resizing active device table 116. FIG. 5 presents a block diagram illustrating software entities and hardware entities in accordance with some embodiments. As shown in FIG. 5, the software entities include operating system 500 and applications 502-506, and the hardware entities include processor 102, memory 104, IOMMU 118, and IO hub 106.

Generally, operating system 500 serves as an intermediary between system hardware in computing device 100 (e.g., processor 102, IO hub 106, etc.) and applications executed by processor 102, such as applications 502-506 (which can be, for example, an system monitoring application, a web browser, and a game application). For example, operating system 500 can be, but is not limited to being, the Windows operating system from Microsoft Inc. of Redmond, Wash.; the OS X operating system from Apple Inc. of Cupertino, Calif.; or another operating system. Operating systems and their general functions are known in the art and hence are not described in detail (aside from operations relating to relocating and/or resizing tables).

In some embodiments, operating system 500 includes a software entity (routine, daemon, or other software entity) that is configured to interact with peripheral devices such as IO device 108, IO interfaces 112, etc. For example, operating system 500 may handle interrupts generated by or destined for a given peripheral device, may serve as an intermediary between the device and other functional blocks in computing device 100, etc. In some embodiments, and as shown in FIG. 5, operating system 500 (i.e., the software entity in operating system 500) may maintain table variables 508 which are local/soft copies of some or all of the values held in registers 120 and/or other values. In these embodiments, operating system 500 may use table variables 508 for locating and determining the size of active device table 116 in memory 104.

In some embodiments, operating system 500 includes or is associated with a software entity (routine, daemon, application, or other software entity) that is configured to monitor, relocate, and/or resize active device table 116. For example, in some embodiments, operating system 500 includes a system performance monitoring daemon that is configured to increase and/or reduce the amount of memory in memory 104 used for holding active device table 116 based on the number of peripheral devices, the level of business of processor 102, operating state, etc. of computing device 100 (or some portion thereof). In these embodiments, the performance monitoring daemon may monitor metrics such as the number of active IO devices coupled to the computing device 100, the type of operations being performed in processor 102, the number of accesses of active device table 116, etc. to determine when the size of active device table 116 should be increased (as active device table 116 becomes more likely to need more than a current number of entries for holding device information) or decreased (as active device table 116 becomes less likely to need a current number of entries 200 for holding device information). In these embodiments, table variables 508 and/or the values in registers 120 may be used by the performance monitoring daemon for keeping track of a size and location of active device table 116.

Although in the embodiment shown in FIG. 5, operating system 500 (or a software entity in operating system 500) maintains table variables 508, in some embodiments, another software entity maintains table variables 508. For example, in some embodiments, an application such as a system monitoring application and/or an active device tracking application can maintain table variables 508. In these embodiments, operating system 500 may not maintain table variables 508, although operating system 500 may use table variables 508 when they are available.

Although embodiments are described using operating system 500 and applications 502-506 as software entities, in some embodiments other software entities are present in computing device 100 and may perform some or all of the operations herein described as being performed by a software entity. For example, in some embodiments, the software entities include applets, hypervisors, virtual machines, scripts, routines, daemons, and/or other software entities that are executed by processor 102 and/or another functional block in computing device 100. Generally, the described embodiments include sufficient software entities to perform the operations herein described.

In addition, although software entities are described as performing some operations in some embodiments, in other embodiments, hardware entities such as processor 102, memory 104, control circuits, functional blocks, IO hub 106, and/or other hardware entities perform some or all of the operations. For example, in some embodiments, a hardware monitoring circuit monitors active device table 116 and determines whether active device table 116 is to be relocated and/or resized based on various factors such as those described herein. In some embodiments, the hardware entity (or entities) performs the operations without software entity involvement.

Relocating the Active Device Table

Figure 6:
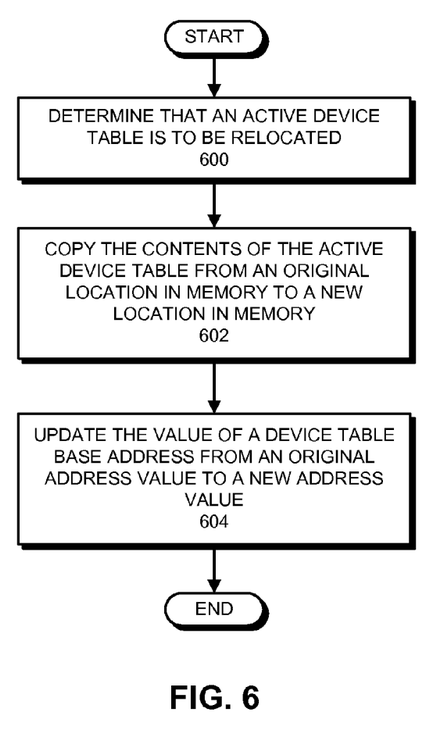
FIG. 6 presents a flowchart illustrating a process for relocating an active device table in accordance with some embodiments.

FIG. 6 presents a flowchart illustrating a process for relocating active device table 116 in accordance with some embodiments. More specifically, during the process shown in FIG. 6, active device table 116 is moved from an original location in memory 104 to a new location in memory 104. Note that the operations shown in FIG. 6 are presented as a general example of operations performed by some embodiments. The operations performed by other embodiments include different operations and/or operations that are performed in a different order. Additionally, although certain mechanisms are used in describing the operations (e.g., processor 102, a software entity, etc.), in some embodiments, other mechanisms perform the operations.

The process shown in FIG. 6 starts when processor 102 determines that active device table 116 is to be relocated (step 600). For example, processor 102 may execute program code from a software entity such as operating system 500, an application 502-506, etc. that sets a register in processor 102 to a predetermined value or otherwise sends a signal that causes processor 102 to relocate active device table 116. In some embodiments, the software entity monitors operations being performed in computing device, memory accesses, average active device table 116 use/fullness, number of accesses of active device table 116, and/or other indications of computing device 100 operations and, based on the monitored operations, determines that active device table 116 is to be relocated from the original location in memory 104 to the new location in memory 104. For example, the software entity can determine that active device table 116 has been accessed more than a given number of times in a predetermined period of time and thus should be moved to a particular physical location in memory 104 or that the memory being used by active device table 116 may be better used for other purposes. In some embodiments, the software entity indicates a new location in memory to which active device table 116 is to be relocated.

Processor 102 next copies the contents of active device table 116 from an original location of active device table 116 in memory 104 to a new location for active device table 116 in memory 104 (step 602). In some embodiments, processor 102 may prevent updates of active device table 116 (e.g., entries 200 for devices being added to or invalidated in active device table 116, device information 202 or control bits 204 for a given entry 200 being updated, etc.) during the copy operation (and perhaps until step 604 is complete) so that the copy of active device table 116 in the new location has the same information as the original copy of active device table 116 in the original location in memory 104. For example, processor 102 may set a lock variable for active device table 116 to a specified lock value, block requests to update active device table 116, or otherwise prevent updates to active device table 116. In these embodiments, an updating entity (hardware and/or software entities, such as processor 102, operating system 500, etc.) may retry updates of active device table 116 at a later time (e.g., after step 602 and 604).

Processor 102 then updates device table base address 300 in registers 120 from an original address value to a new address value (step 604). As described above, device table base address 300 is an address that directly or indirectly indicates the location of active device table 116 in memory 104. During the update operation, processor 102 overwrites the original value of device table base address 300 with the new address value, which causes entities in computing device 100 to use the new address to directly or indirectly determine the location of active device table 116 in memory 104. As used herein, "directly" indicating the location means that device table base address 300 is an address (or another value) that can be used alone in determining a location in memory 104 of active device table 116. For example, device table base address 300 may be a 64-bit address of a first entry 200 in active device table 116. In contrast, as used herein, "indirectly" indicating the location means that device table base address 300 is an address that can be used in combination with one or more other values in determining a location in memory 104 of active device table 116. For example, the device table base address 300 may be a 32-bit offset that can be combined with a known address to compute an address of a first entry 200 in active device table 116. In some embodiments, processor 102 atomically updates the value of the device table base address 300, so that other entities in computing device 100 are blocked from reading device table base address 300 until the updating operation is complete. For example, processor 102 can obtain a lock on the register during the update, block reads of the register, etc.

Figure 9:
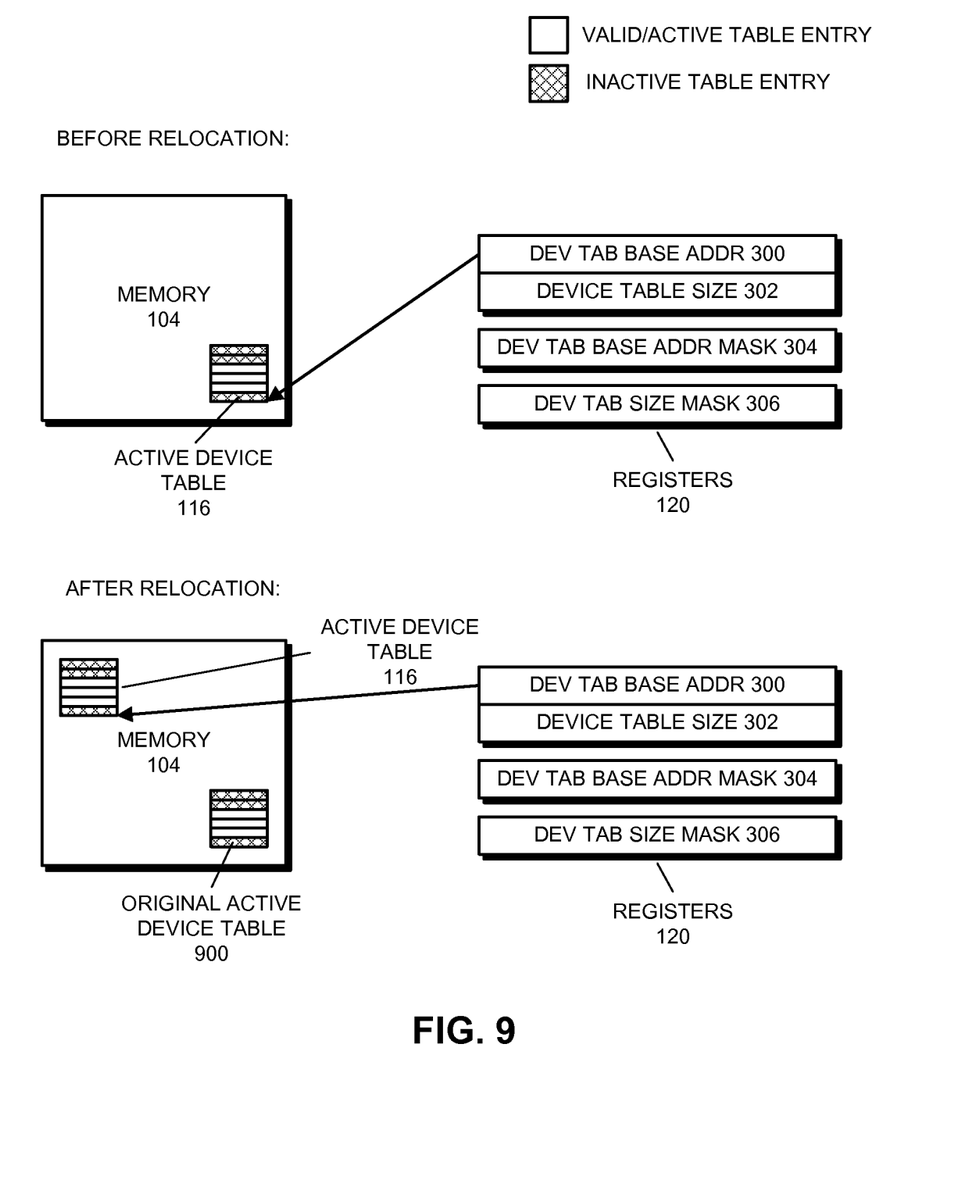
FIG. 9 presents a block diagram illustrating an active device table and registers before and after relocating the active device table in accordance with some embodiments.

FIG. 9 presents a block diagram illustrating active device table 116 and registers 120 before and after the relocation of active device table 116 such as is described in FIG. 6 in accordance with some embodiments. Before active device table 116 is relocated, device table base address 300 stores a value of address A (e.g., a starting address in memory 104 for active device table 116) and device table size 302 stores a value of size X (e.g., a number of fixed-size entries, a number of bytes, and/or another value). As can be seen, there are a number of valid and invalid entries 200 in active device table 116 before active device table 116 is relocated in memory 104.

After the relocation of active device table 116, device table base address 300 stores a value of address Q (e.g., a starting address in memory 104 for active device table 116) and device table size 302 stores a value of size X. Thus, active device table 116 appears to entities in computing device 100 to be located address Q and with size X, with the same arrangement of valid and invalid entries 200 as active device table 116 in the original location in memory 104. As can be seen in FIG. 9, original active device table 900 is still present in memory 104 and may be deallocated or otherwise freed after step 604.

As described above, after relocating active device table 116, other entities in computing device 100 such as processor 102, operating system 500, IO device 108, etc. are able to use the device table base address 300 and device table size 302 for accessing active device table 116. For example, in some embodiments, an entity can use the device table base address 300 and device table size 302 to update an active device table 116 entry 200 to include information about a device that has become available in computing device 100.

Relocating and Resizing the Active Device Table

Figure 7:
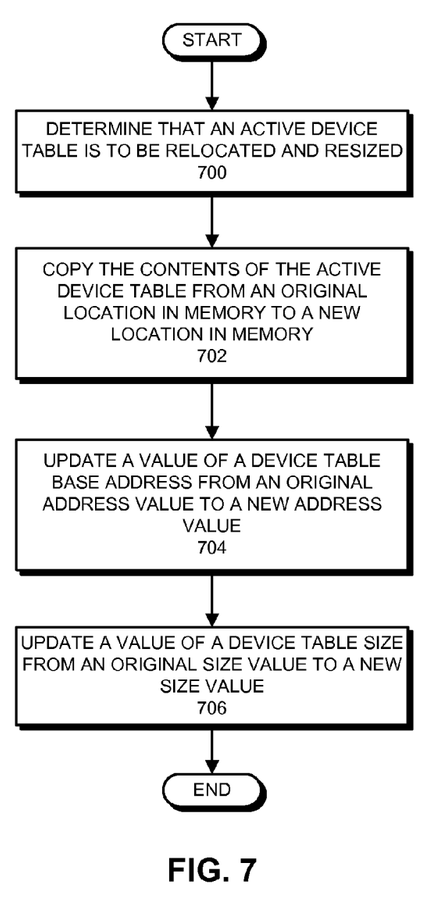
FIG. 7 presents a flowchart illustrating a process for relocating and resizing an active device table in accordance with some embodiments.

FIG. 7 presents a flowchart illustrating a process for relocating and resizing active device table 116 in accordance with some embodiments. More specifically, during the process shown in FIG. 7, active device table 116 is moved from an original location in memory 104 to a new location in memory 104 and resized from an original size to a new size. Note that the operations shown in FIG. 7 are presented as a general example of operations performed by some embodiments. The operations performed by other embodiments include different operations and/or operations that are performed in a different order. Additionally, although certain mechanisms are used in describing the operations (e.g., processor 102, a software entity, etc.), in some embodiments, other mechanisms perform the operations.

The process shown in FIG. 7 starts when processor 102 determines that active device table 116 is to be relocated and resized (step 700). For example, processor 102 may execute program code from a software entity such as operating system 500, an application 502-506, etc. that sets a register in processor 102 to a predetermined value or otherwise sends a signal that causes processor 102 to relocate and resize active device table 116. In some embodiments, the software entity monitors operations being performed in computing device, memory accesses, average active device table 116 use/fullness, and/or other indications of computing device 100 operations and, based on the monitored operations, determines that active device table 116 is to be relocated from the original location in memory 104 to the new location in memory 104 and resized from the original size to the new size. For example, the software entity can determine that active device table 116 has been more than a threshold amount full for a predetermined period of time and/or is in a location in memory that is better used for storing other types of data and thus active device table 116 should be moved to the new location in memory 104 and increased in size (i.e., to include more entries 200).

Processor 102 next copies the contents of active device table 116 from an original location of active device table 116 in memory 104 to a new location for active device table 116 in memory 104 (step 702). In some embodiments, processor 102 may prevent updates of active device table 116 (e.g., entries 200 for devices being added to or invalidated in active device table 116, device information 202 or control bits 204 for a given entry 200 being updated, etc.) during the copy operation (and perhaps until step 604 is complete) so that the copy of active device table 116 in the new location has the same information as the original copy of active device table 116 in the original location in memory 104. For example, processor 102 may set a lock variable for active device table 116 to a specified lock value, block requests to update active device table 116, or otherwise prevent updates to active device table 116. In these embodiments, an updating entity (hardware and/or software entities, such as processor 102, operating system 500, etc.) may retry updates of active device table 116 at a later time (e.g., after step 602 and 604).

As described above, the resizing operation in FIG. 7 involves increasing the size of active device table 116. In other words, one or more entries 200 are added to the set of entries in the original active device table 116. In this case, processor 102 copies as many values as were in the original active device table 116 to the new active device table 116. In some embodiments, the additional entries are handled by writing a predetermined value (e.g., all zeros, all ones, a selected bit pattern, etc.) into the additional entries, leaving existing values in the additional entries unchanged, or otherwise updating the additional entries. In some embodiments, processor 102 sets metadata for the additional entries to indicate that the additional entries are invalid or otherwise do not yet contain information about a peripheral device. Note that, if the resizing operation had been reducing the size of active device table 116, active device table 116 may be simply truncated (i.e., one or more entries are not copied from active device table 116 in the original location to active device table 116 in the new location). In these embodiments, peripheral devices for which information is included in truncated entries (and therefore lost) can be recognized by processor 102 and rediscovered, caused to reregister or reinitialize, assigned new identifiers, etc. so that information for these devices is included in the smaller active device table 116. In some embodiments, during the copy operation for an active device table 116 that has been reduced in size, all possible valid/active entries are copied to the new active device table. In these embodiments, active entries 200 in the original active device table 116 may be copied to different entries 200 in the new active device table.

Processor 102 then updates device table base address 300 in registers 120 from an original address value to a new address value (step 704). As described above, device table base address 300 is an address that directly or indirectly indicates the location of active device table 116 in memory 104. During the update operation, processor 102 overwrites the original value of device table base address 300 with the new address value, which causes entities in computing device 100 to use the new address to directly or indirectly determine the location of active device table 116 in memory 104. In some embodiments, processor 102 atomically updates the value of the device table base address 300, so that other entities in computing device 100 are blocked from reading device table base address 300 until the updating operation is complete. For example, processor 102 can obtain a lock on the register during the update, block reads of the register, etc.

Processor 102 also updates device table size 302 in the corresponding register in registers 120 from an original size value to a new size value (step 706). As described above, device table size 302 can be any value that directly or indirectly represents a size of active device table 116. During the update operation, processor 102 overwrites the original value of device table size 302 with the new size value, which causes computing device 100 to use the new size value to directly or indirectly determine the size of active device table 116 in memory 104. For example, if the original active device table 116 had 64 C-bit entries with a corresponding device table size 302, the new active device table 116 may have 96 C-bit entries with the new device table size 302 being 150% of the original device table size 302. In some embodiments, processor 102 performs operations 702 and 704 atomically, so that no other hardware or software entity in computing device 100 is able to read the original value of device table base address 300 and/or device table size 302 during the updating operation. In some embodiments, the atomic update includes updating a single register that includes both device table base address 300 and device table size 302.

Figure 10:
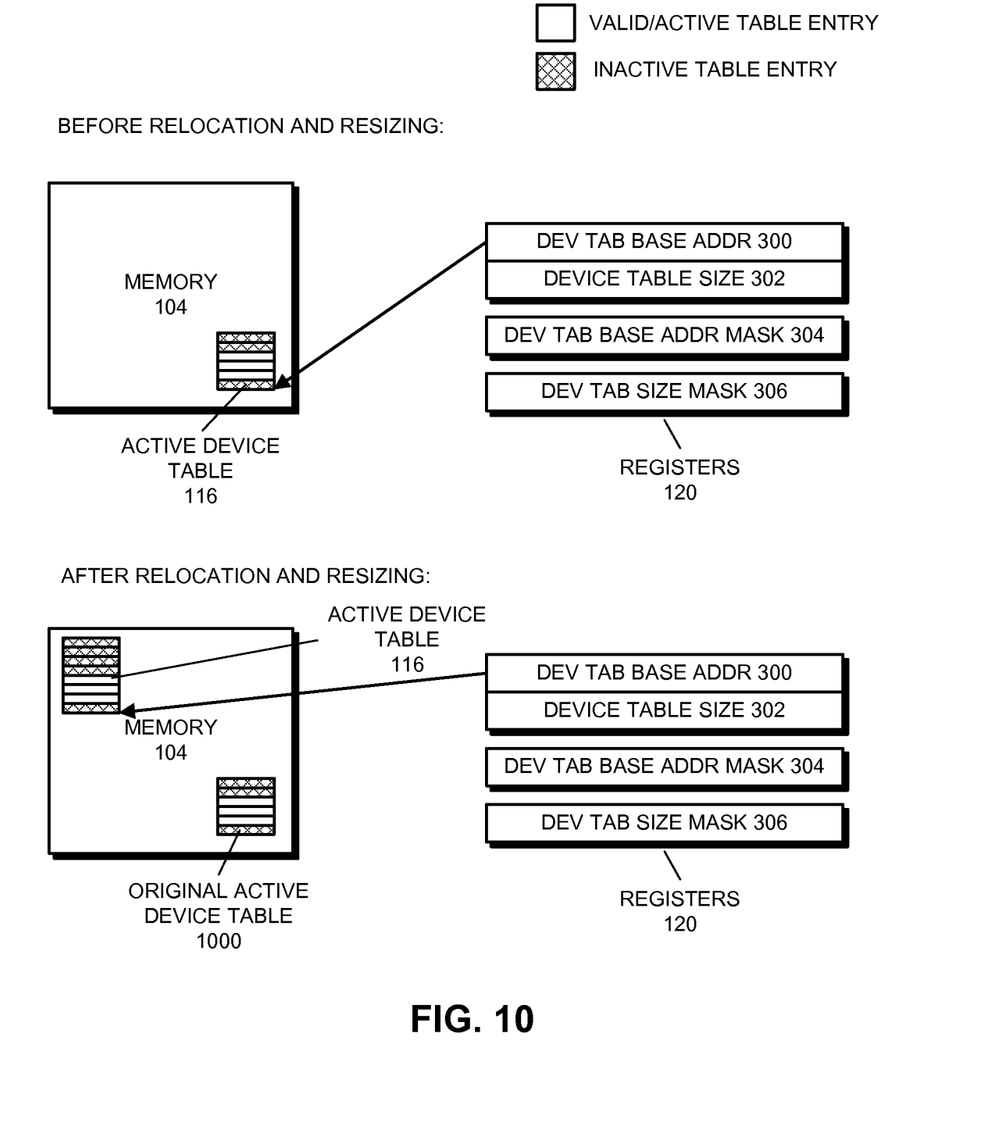
FIG. 10 presents a block diagram illustrating an active device table and registers before and after relocating and resizing the active device table in accordance with some embodiments.

FIG. 10 presents a block diagram illustrating active device table 116 and registers 120 before and after the relocation and resizing of active device table 116 such as is described in FIG. 7 in accordance with some embodiments. Before active device table 116 is relocated, device table base address 300 stores a value of address A (e.g., a starting address in memory 104 for active device table 116) and device table size 302 stores a value of size X (e.g., a number of fixed-size entries, a number of bytes, and/or another value). As can be seen, there are a number of valid and invalid entries 200 in active device table 116 before active device table 116 is relocated in memory 104 and resized.

After the relocation and resizing of active device table 116, device table base address 300 stores a value of address Q (e.g., a starting address in memory 104 for active device table 116), and device table size 302 stores a value of size Y (e.g., e.g., a number of fixed-size entries, a number of bytes, and/or another value). Thus, active device table 116 appears to entities in computing device 100 to be located address Q and with size Y, with the same arrangement of valid and invalid entries 200 as active device table 116 in the original location in memory 104 along with the one or more additional entries 200. As can be seen in FIG. 10, original active device table 1000 is still present in memory 104 and may be deallocated or otherwise freed after step 706.

As described above, after relocating and resizing active device table 116, other entities in computing device 100 such as processor 102, operating system 500, IO device 108, etc. are able to use the device table base address 300 and device table size 302 for accessing active device table 116. For example, in some embodiments, an entity can use the device table base address 300 and device table size 302 to update an active device table 116 entry 200 to include information about a device that has become available in computing device 100.

Resizing the Active Device Table without Relocating the Active Device Table

Figure 8:
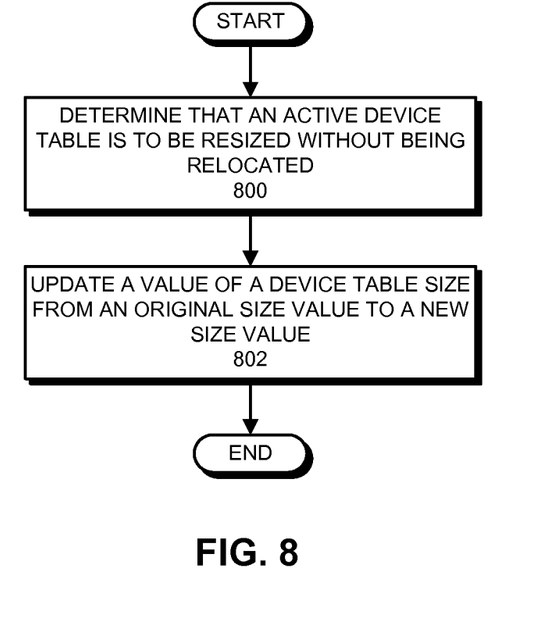
FIG. 8 presents a flowchart illustrating a process for resizing an active device table without relocating the active device table in accordance with some embodiments.

FIG. 8 presents a flowchart illustrating a process for resizing active device table 116 without relocating the active device table 116 in accordance with some embodiments. More specifically, during the process shown in FIG. 8, active device table 116 is resized from an original size to a new size without being moved from an original location in memory 104 to a new location in memory 104. Note that the operations shown in FIG. 8 are presented as a general example of operations performed by some embodiments. The operations performed by other embodiments include different operations and/or operations that are performed in a different order. Additionally, although certain mechanisms are used in describing the operations (e.g., processor 102, a software entity, etc.), in some embodiments, other mechanisms perform the operations.

The process shown in FIG. 8 starts when processor 102 determines that active device table 116 is to be resized (step 800). For example, processor 102 may execute program code from a software entity such as operating system 500, an application 502-506, etc. that sets a register in processor 102 to a predetermined value or otherwise sends a signal that causes processor 102 to resize active device table 116. In some embodiments, the software entity monitors operations being performed in computing device, memory accesses, average active device table 116 use/fullness, and/or other indications of computing device 100 operations and, based on the monitored operations, determines that active device table 116 is to be resized from the original size to the new size. For example, the software entity can determine that active device table 116 has been more than a threshold amount full for a predetermined period of time and thus active device table 116 should be increased in size (i.e., to include more entries 200).

Processor 102 next updates device table size 302 in the corresponding register in registers 120 from an original size value to a new size value (step 802). As described above, device table size 302 can be any value that directly or indirectly represents a size of active device table 116. During the update operation, processor 102 overwrites the original value of device table size 302 with the new size value, which causes computing device 100 to use the new size value to directly or indirectly determine the size of active device table 116 in memory 104. For example, active device table 116 may be increased in size from 64 C-bit entries to 89 C-bit entries with the new device table size 302 being set accordingly. Note that, processor 102 performs operation 802 atomically, so that no other hardware or software entity in computing device 100 is able to read the original value of device table size 302 during the updating operation. In some embodiments, the atomic update includes updating a single register that includes both device table base address 300 and device table size 302.

Figure 11:
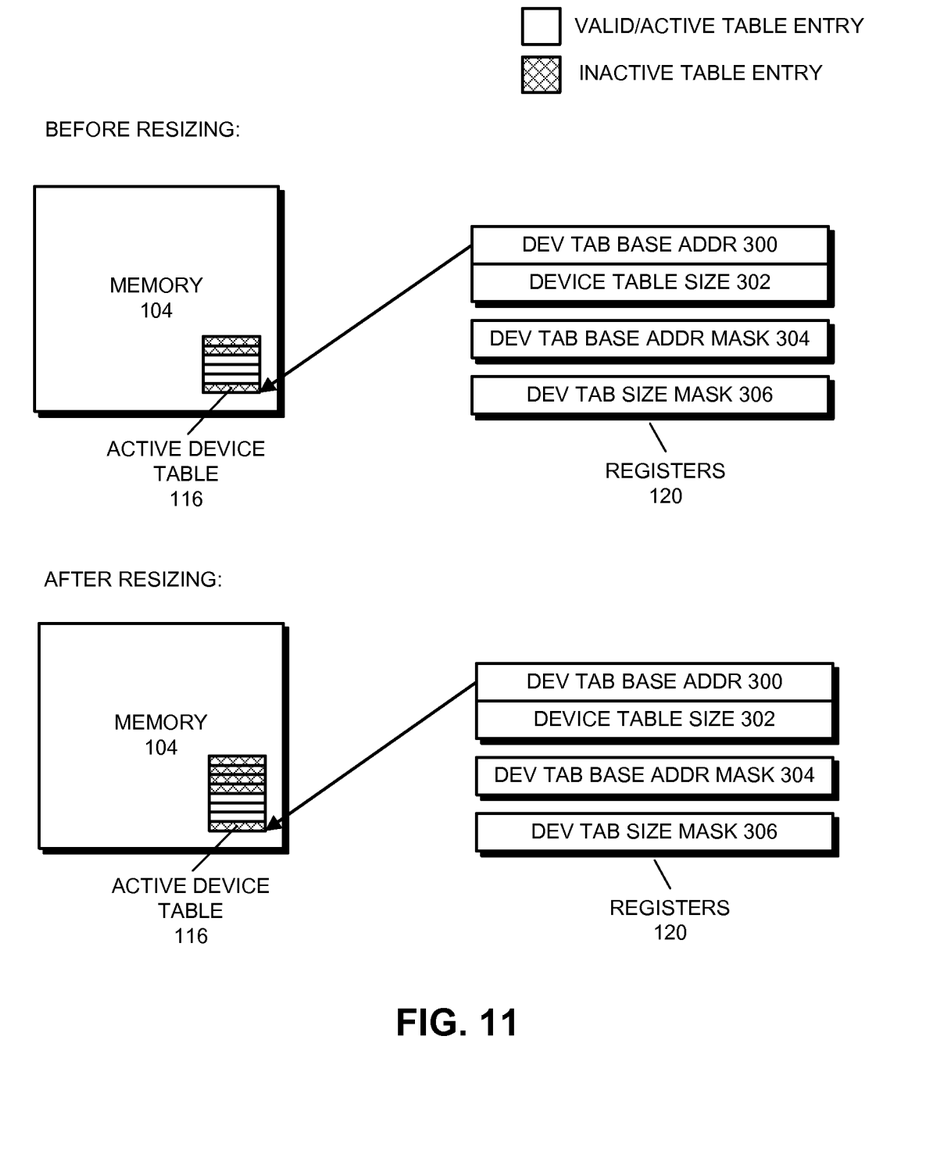
FIG. 11 presents a block diagram illustrating an active device table and registers before and after resizing the active device table without relocating the active device table in accordance with some embodiments.

FIG. 11 presents a block diagram illustrating active device table 116 and registers 120 before and after the resizing of active device table 116 without relocating active device table 116 such as is described in FIG. 8 in accordance with some embodiments. Before active device table 116 is resized, device table base address 300 stores a value of address A (e.g., a starting address in memory 104 for active device table 116) and device table size 302 stores a value of size X (e.g., a number of fixed-size entries, a number of bytes, and/or another value). As can be seen, there are a number of valid and invalid entries 200 in active device table 116 before active device table 116 is resized.

After the resizing of active device table 116, device table base address 300 still stores a value of address A (e.g., a starting address in memory 104 for active device table 116), and device table size 302 stores a value of size Y (e.g., e.g., a number of fixed-size entries, a number of bytes, and/or another value). Thus, active device table 116 appears to entities in computing device 100 to be located address A and with size Y, with the same arrangement of valid and invalid entries 200 as active device table 116 in the original location in memory 104 along with the one or more additional entries 200.

As described above, after resizing active device table 116, other entities in computing device 100 such as processor 102, operating system 500, 10 device 108, etc. are able to use the device table base address 300 and device table size 302 for accessing active device table 116. For example, in some embodiments, an entity can use the device table base address 300 and device table size 302 to update an active device table 116 entry 200 to include information about a device that has become available in computing device 100.

Pseudocode Embodiment

Figure 12:
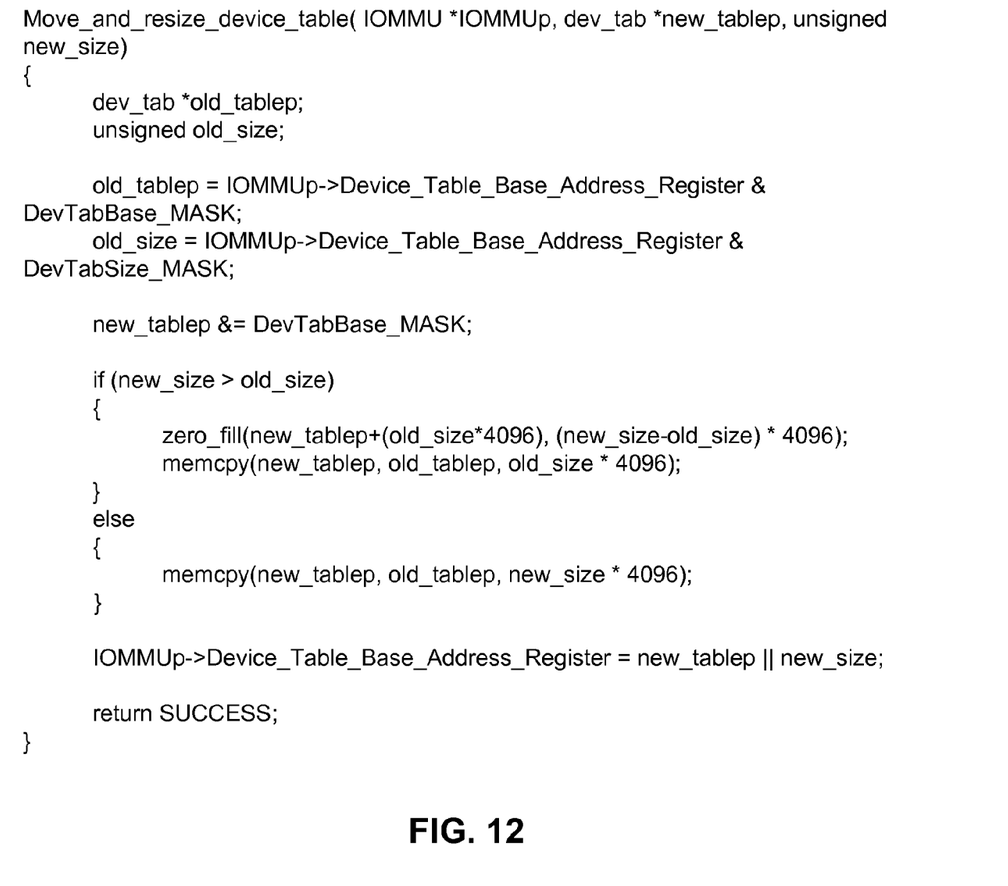
FIG. 12 presents pseudocode illustrating operations performed in accordance with some embodiments.

FIG. 12 presents pseudocode illustrating operations performed in accordance with some embodiments. Generally, the pseudocode in FIG. 12 includes operations (instructions, calls, commands, etc.) for receiving a pointer to one or more of a new location in memory 104 for active device table 116 and an indication of a new size for active device table 116, and accordingly relocating and/or resizing active device table 116. Note that the operations shown in FIG. 12 are presented as a general example of operations performed by some embodiments. The operations performed by other embodiments include different operations and/or operations that are performed in a different order. Additionally, although certain mechanisms are used in describing the operations (e.g., processor 102, a software entity, etc.), in some embodiments, other mechanisms perform the operations.

As can be seen in FIG. 12, the pseudocode includes the function move_and_resize_device_table with parameters IOMMU *IOMMUp, dev_tab *new_tablep, and unsigned new_size. *IOMMUp is a pointer of IOMMU type indicating memory elements (registers, etc.) that store information associated with IOMMU 118. In some embodiments, the memory elements include registers 120, and thus *IOMMUp can be used to acquire device table base address 300 and device table size 302, as described below. *new_tablep is a pointer of dev_tab type indicating a device table data structure that stores information about a new device table. new_size is an unsigned variable indicating a new size for active device table 116 or the above-described new device table, in the case of both relocate and resize.

In the move_and_resize_device_table function, a dev_tab pointer *old_tablep and an unsigned old_size variable are instantiated. *old_tablep is then set equal to device table base address 300 by using the IOMMUp pointer to access registers 120. Note that, for the embodiment shown in FIG. 12, both device table base address 300 and device table size 302 are stored in the same register in registers 120, which is called Device_Table_Base_Address_Register in FIG. 12, and which may be arranged similarly to device table base address register 400. Thus, when setting *old_tablep equal to device table base address 300, device table base address mask 304 (shown as DevTabBase_MASK in FIG. 12) is used to mask the portion of Device_Table_Base_Address_Register that does not include device table base address 300. old_size is next set equal to device table size 302 by again using the IOMMUp pointer to access registers 120. Similarly to device table base address 300, when setting old_size equal to device table size 302, device table size mask 306 (shown as DevTabSize_MASK in FIG. 12) is used to mask the portion of Device_Table_Base_Address_Register that does not include device table size 302.

Next, new_tablep is logically ANDed with device table base address mask 304 to remove extraneous information (i.e., bits) from new_tablep. This operation is generally to avoid improperly formatted new_tablep pointers from causing errors when new_tablep is used in subsequent operations, including the memcopy operation.

new_size is then compared to old_size to determine if new_size is larger, and thus if the new active device table is larger than the existing/current active device table. If new_size is larger than old_size, a zero_fill operation is performed to fill the additional entries in the new active device table 116 with zero values. The contents of the old active device table 116 are then copied to the new active device table 116. As described above, in some embodiments, when performing the copy operation, computing device 100 is configured, via lock bits, request blocking, etc., to prevent updates of active device table 116 so that the copy is consistent with the original active device table 116.

If new_size is equal to or smaller than old_size, the contents of the old active device table 116 are copied to the new active device table 116. As described above, in some embodiments, when performing the copy operation, computing device 100 is configured, via lock bits, request blocking, etc., to prevent updates of active device table 116 so that the copy is consistent with the original active device table 116. Note that in the case that new_size is smaller than old_size (i.e., the new active device table 116 is smaller than the original active device table 116), memcopy, in some embodiments, does not copy entries 200 beyond new_size, thereby truncating the copy. As described above, in these embodiments, peripheral devices for whom the information is not copied can subsequently be caused to reregister, etc. so that active device table 116 includes information about the peripheral devices.

Device table base address 300 is then set equal to new_tablep and device table size 302 is set equal to new_size by using the IOMMUp pointer to access registers 120. As can be seen in FIG. 12, both device table base address 300 and device table size 302 are set in a single operation. As described above, this operation can be performed this way because both values are in corresponding locations in the device_table_base_address_register. Note that, in some embodiments, updates of active device table 116 are prevented until the setting operation is completed to ensure that the new copy of active device table 116 is consistent. A success value is then returned from the move_and_resize_device_table function.

Operations for Other Tables

Although embodiments are described using active device table 116, in some embodiments, the operations herein described are performed for a different table. Generally, relocating and/or resizing any table that is referred to using values similar to the values in registers 120 can be handled as described herein.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A computing device, comprising:
a memory storing an original table comprising a plurality of entries; and
at least one register storing a table base address indicating an original location of the original table in the memory and a table size indicating an original size of the original table in the memory;
wherein the computing device at least one of relocates or resizes the original table in the memory by:
when relocating the original table,
copying, using the table base address, some or all of the entries from the original table to a new table in the memory; and
updating the table base address to indicate a location of the new table in the memory; and
when resizing the original table,
updating the table size to indicate a new size;
wherein the original table and the new table are active device tables, each active device table comprising information to be used for interacting with peripheral devices in the computing device.

2. The computing device of claim 1, wherein, when resizing the original table and the new size is larger than the original size, the computing device:
writes one or more predetermined values to additional entries in the new table that are not present in the original table.

3. The computing device of claim 1, wherein, when both relocating and resizing the original table and the new size is smaller than the original size, copying some or all of the entries from the original table to the new table comprises:
copying entries from the original table for which a corresponding entry exists in the new table and not copying any remaining entries from the original table.

4. The computing device of claim 1, wherein, when resizing the original table without relocating the original table and the new size is smaller than the original size, for each peripheral device for which information is lost during the resizing, the computing device updates the original table to include information for the peripheral device.

5. The computing device of claim 1, wherein, when both relocating and resizing the original table and the new size is smaller than the original size, for each peripheral device for which information is lost during the copying, the computing device updates the new table to include information for the peripheral device.

6. The computing device of claim 1, wherein the table base address and the table size are stored in corresponding portions of a same register, and wherein, when both relocating and resizing the original table, updating the table base address and the table size comprises performing a single update operation to update both the table base address and the table size in the register.

7. The computing device of claim 1, wherein, after updating the table base address, the computing device:
frees the memory used for storing the original table in the memory.

8. The computing device of claim 1, wherein relocating or resizing the original table occurs without halting or significantly effecting operation of and interaction with the peripheral devices.

9. A method for operating a computing device that comprises a memory storing an original table comprising a plurality of entries and at least one register storing a table base address indicating an original location of the original table in the memory and a table size indicating an original size of the original table in the memory, the method comprising:
by the computing device, at least one of relocating or resizing the original table in the memory by:
when relocating the original table,
copying, using the table base address, some or all of the entries from the original table to a new table in the memory; and
updating the table base address to indicate a location of the new table in the memory; and
when resizing the original table,
updating the table size to indicate a new size;
wherein the original table and the new table are active device tables, each active device table comprising information to be used for interacting with peripheral devices in the computing device.

10. The method of claim 9, wherein, when resizing the original table and the new size is larger than the original size, the method further comprises:
writing one or more predetermined values to additional entries in the new table that are not present in the original table.

11. The method of claim 9, wherein, when both relocating and resizing the original table and the new size is smaller than the original size, copying some or all of the entries from the original table to the new table comprises:
copying entries from the original table for which a corresponding entry exists in the new table and not copying any remaining entries from the original table.

12. The method of claim 9, wherein, when resizing the original table without relocating the original table and the new size is smaller than the original size, for each peripheral device for which information is lost during the resizing, the method further comprises updating the original table to include information for the peripheral device.

13. The method of claim 9, wherein, when both relocating and resizing the original table and the new size is smaller than the original size, for each peripheral device for which information is lost during the copying, the method further comprises updating the new table to include information for the peripheral device.

14. The method of claim 9, wherein the table base address and the table size are stored in corresponding portions of a same register, and wherein, when both relocating and resizing the original table, updating the table base address and the table size comprises performing a single update operation to update both the table base address and the table size in the register.

15. The method of claim 9, wherein, after updating the table base address, the method further comprises:
freeing the memory used for storing the original table in the memory.

16. A non-transitory computer-readable storage medium storing instructions that, when executed by a computing device that comprises a memory storing an original table having a plurality of entries and comprises at least one register storing a table base address indicating an original location of the original table in the memory and a table size indicating an original size of the original table in the memory, cause the computing device to perform a method comprising:
at least one of relocating or resizing the original table in the memory by:
when relocating the original table,
copying, using the table base address, some or all of the entries from the original table to a new table in the memory; and
updating the table base address to indicate a location of the new table in the memory; and
when resizing the original table,
updating the table size to indicate a new size;
wherein the original table and the new table are active device tables, each active device table comprising information to be used for interacting with peripheral devices in the computing device.

17. The computer-readable storage medium of claim 16, wherein, when resizing the original table and the new size is larger than the original size, the method further comprises:
writing one or more predetermined values to additional entries in the new table that are not present in the original table.

18. The computer-readable storage medium of claim 16, wherein, when both relocating and resizing the original table and the new size is smaller than the original size, copying some or all of the entries from the original table to the new table comprises:
copying entries from the original table for which a corresponding entry exists in the new table and not copying any remaining entries from the original table.

* * * * *